Patented Jan. 15, 1929.

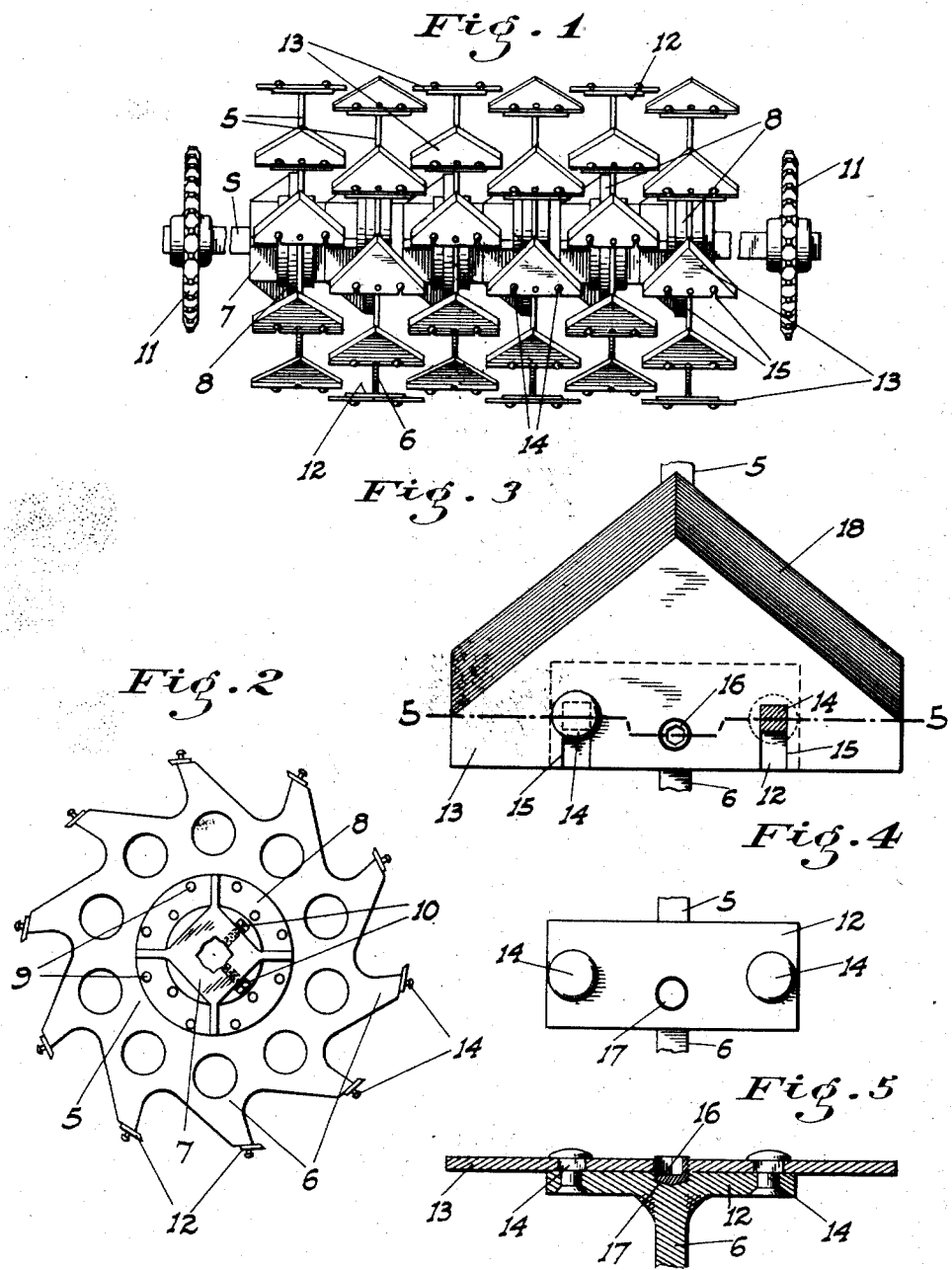

REISSUED 1,699,152

UNITED STATES PATENT OFFICE.

TONY STEPHEN MILLER AND QUAN JUE LEONG, OF RYDE, CALIFORNIA.

ROTARY EARTH-WORKING ELEMENT.

Application filed May 9, 1928. Serial No. 276,232.

This invention relates to certain new and useful improvements in rotary earthworking elements, particularly adapted for use in connection with rotary plows.

The primary object of the present invention is to provide a rotary cylindrical earthworking element for plows of the above kind, which is extremely simple and durable in construction as well as efficient in operation.

A more specific object is to provide an earthworking element of the above kind which may be cheaply and easily manufactured as well as readily assembled or repaired.

Another object of the invention is to provide a rotary earthworking element for plows wherein the element is of effective cylindrical form and embodies plow blades arranged for successive sub-surface operation, the plow blades being accordingly arranged to extend circumferentially as defined from rotary earthworking elements having radially projecting or extending blades.

Still another object is to provide simple and effective means by means of which the plow blades may be detachably secured in place.

Other objects will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Fig. 1 is a plan view of a rotary earthworking element constructed in accordance with the present invention;

Fig. 2 is a side elevational view of one of the blade carrying units of the element shown in Figure 1;

Fig. 3 is an enlarged detail plan view showing the means for detachably securing the plow blades in place upon the cross-bar mounting plates of the blade carrying units;

Fig. 4 is a view similar to Figure 3 with the plow blade removed;

Fig. 5 is a transverse section taken substantially upon line 5—5 of Figure 3;

Referring more in detail to the drawings, the present earthworking element embodies a drive shaft S, preferably of square form, and upon which are secured a plurality of blade or shovel carrying units which cooperate to form a substantially cylindrical rotary earthworking element. As shown, each blade or shovel carrying unit comprises a sheet metal plate or disk 5 formed with a circular series of uniformly spaced integral and outwardly projecting shovel or blade supporting arms 6 which preferably project tangentially from the edge of the plate or disk 5 as shown.

Each disk 5 is formed with a central circular opening in which is fitted a hub member 7 that projects beyond opposite sides of the disk and is provided near one end with an annular securing flange 8 which flatly engages the adjacent side of the disk 5 and is bolted to the latter as at 9. With the hubs 7 projecting beyond opposite sides of the disks 5, it is apparent that when the plurality of blade carrying units are disposed upon the drive shaft S with the ends of the hubs in adjacent contiguous relation, the disks 5 will be maintained in uniformly spaced relation as illustrated in Figure 1. The openings in the hubs 7 of the units are preferably of substantially square form as shown in Figure 2 so as to snugly accommodate the drive shaft S, and the hubs are equipped with suitable set screws 10 or the like for detachably fastening the units to the shaft S and against endwise movement on the latter. It will be understood that the shaft S is adapted to be suitably journaled upon a carrying frame as generally taught in connection with rotary earthworking implements, and for the purpose of rotatably driving the shaft S, suitable sprocket wheels 11 are fastened upon the projecting ends of shaft S for engagement by driving sprocket chains as is also shown in said co-pending application.

Rigid with the outer ends of the blade supporting arms 6 are rectangular blade supporting plates 12, which may be referred to as cross-bar blade supporting plates in view of their positions transversely of the arms 6 as clearly illustrated in several of the views. These plates 12 are accordingly positioned so that the planes of the same are substantially parallel with the direction of their movement when the earthworking element is rotated, and detachably fastened upon the outer surfaces of the plates 12 are the plow blades or shovels 13 which are thus disposed to successively pass into and bodily beneath the surface of the soil.

This type of blade or shovel is what is known as a sub-surface plow blade, and when used in plurality for successive operation at uniform distances from the axis of rotation, as herein, will insure plowing of the soil at a uniform depth. Moreover, the more complete destruction of weeds is insured by reason of this operation due to severing of the stalks of the weeds below the surface of the soil.

As shown clearly in Figures 3 to 5 inclusive, each blade supporting plate 12 is provided with a pair of upstanding headed pins 14, one at each end of the plate 12, and the blade 13 is provided with slots 15, the width of which is less than the diameter of the heads of the pins 14 but sufficient to permit reception of the shanks of said pins 14. Thus, by positioning the blade 13 upon the outer surface of its associated mounting plate 12 and then bodily moving said blade 13 so that the shanks of the pins 14 will pass into the slots 15, the heads of pins 14 will engage the outer surface of the blade 13 at opposite sides of the slots 15 so that the blade is effectively held against displacement from the plate 12 radially of the earthworking element. It is thus apparent that it is now only necessary to prevent displacement of the blade 13 relative to its mounting plate 12 in a plane parallel with the planes of said blade 13 and plate 12 to insure retention of the blade in this operative position thereof. For the latter purpose, the blade 13 is provided with a threaded opening at a point between the slots 15, and having threaded engagement in this opening is a set screw 16 adapted to impinge the outer surface of the adjacent plate 12 so that when the screw 16 is threaded inwardly, the blade 13 will be forced into tight engagement with the heads of pins 14 and the shifting of the blade 13 effectively prevented.

However, this shifting of the blade is more positively guarded against by providing the mounting plate 12 with a socket or recess 17 at a point between the pins 14 and so as to receive the inner end of the set screw 16 when it is threaded inwardly as described above. As shown, the screw 16 is preferably formed without a head so as to avoid objectionable projecting parts, but is of the socket type as shown to facilitate manual turning thereof by the use of a properly formed tool.

The blades are provided with similar forwardly converging edges 18 which are oblique to the axis of rotation and line of travel when the blade is secured in place, while the slots 15 open through the back edges of the blades for permitting the engagement of the latter with the headed pins 14.

From the foregoing description it is apparent that an earthworking element constructed in accordance with the above will be extremely simple and durable in construction and may be cheaply and easily manufactured and assembled, as well as readily and expeditiously taken apart for renewal or repair purposes. This is particularly true in connection with the attachment or detachment of the plow blades or shovels. By having the slots 15 extend forwardly from the back edge of the blade or from the openings 20, the pressure on the blades when engaging and passing into the soil will tend to force the blades toward operative position rather than from such position. Naturally, this insures against placing material strain upon the set screws 16 when the element is in use. At the same time, the possibility of accidental detachment of the blades is reduced to a minimum when the device is in operation.

The arms 6 not only extend tangentially but increase in width toward their inner ends and this provides a construction which will effectively withstand the severe usage to which devices of this character are put. The openings in the plate 5 surrounding the flange 8 are merely for reducing the weight of the earthworking element, which may be found desirable in view of the heavy gage metal from which the disks 5 are stamped.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful, and desire to secure by Letters Patent is:

1. A rotary cylindrical earth working element for plows embodying a supporting structure having outwardly projecting arms, blade supporting plates rigid with the outer ends of the arms and disposed in planes substantially parallel with their path of movement when the element is rotated, and sub-surface plow blades fastened on and flatly engaging the outer surfaces of said blade supporting plates, said arms projecting tangentially of the supporting structure and inclining outwardly to their direction of rotation.

2. A rotary cylindrical earth working element for plows embodying a supporting structure, blade supporting plates rigidly attached to the structure at the periphery thereof, and disposed in planes substantially parallel with their path of movement when the element is rotated, and sub-surface plow blades fastened on and flatly engaging the outer surfaces of said blade supporting plates, the blade fastening means embodying headed pins carried by the supporting plates, said blades having slots for reception of the shanks of said headed pins to permit engagement of the blades under the heads of the pins when the blades are shifted in one direction parallel with the planes of the supporting plates, and means to then prevent shifting of the blades in the opposite direction.

3. A rotary cylindrical earth working element for plows embodying a supporting structure, blade supporting plates rigidly attached to the stucture at the periphery thereof and disposed in planes substantially parallel with their path of movement when the element is rotated, sub-surface plow blades fastened on and flatly engaging the outer surfaces of said blade supporting plates, the blade fastening means embodying headed pins carried by the supporting plates, said blades having slots for reception of the shanks of said headed pins to permit engagement of the blades under the heads of the pins when the blades are shifted parallel with the planes of the supporting plates, and set screws carried by the blades and engageable with the supporting plates for forcing the blades outwardly into tight engagement with the heads of the pins.

4. A rotary cylindrical earth working element for plows embodying a supporting structure, blade supporting plates rigidly secured to the structure at the periphery thereof and disposed in planes substantially parallel with their path of movement when the element is rotated, sub-surface plow blades fastened on and flatly engaging the outer surfaces of said blade supporting plates, the blade fastening means embodying headed pins carried by the supporting plates, said blades having slots for reception of the shanks of said headed pins to permit engagement of the blades under the heads of the pins when the blades are shifted parallel with the planes of the supporting plates, and means for forcing the blades outwardly into tight engagement with the heads of the pins.

5. In a plow, a rotary earth working element having blade supporting standards provided with transverse blade receiving plates on their outer ends, headed studs projecting outwardly from the plates, and blades having slots for sliding cooperation with the studs to secure the blades on said plates, and means associated with the plates and blades for holding the blades in cooperative engagement with the studs.

6. In a plow, a rotary earth working element having blade supporting standards provided with transverse blade receiving plates on their outer ends, headed studs projecting outwardly from the plates, blades having slots for cooperation with the studs to secure the blades on said plates, and means associated with the plates and blades to force the latter outwardly into firm engagement with the heads of the studs.

7. A rotary cylindrical earth working element for plows comprising a supporting structure having outwardly projecting arms, a transverse blade supporting plate rigid with the outer end of each arm, said plate extending on both sides of the arm and being disposed in a plane substantially parallel with the path of movement of the arms when the element is rotated, and sub-surface plow blades fastened on and flatly engaging the outer surfaces of the blade supporting plates.

In testimony whereof we affix our signatures.

TONY STEPHEN MILLER.
QUAN JUE LEONG.